(12) United States Patent
Lee et al.

(10) Patent No.: US 8,311,167 B2
(45) Date of Patent: Nov. 13, 2012

(54) ULTRA WIDE BAND DEVICE FOR DETECTION AND AVOIDANCE OF ULTRA WIDE BAND SIGNAL

(75) Inventors: Jeong-Sang Lee, Seoul (KR); Jae-Ho Roh, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 907 days.

(21) Appl. No.: 12/320,872

(22) Filed: Feb. 6, 2009

(65) Prior Publication Data
US 2009/0219975 A1    Sep. 3, 2009

(30) Foreign Application Priority Data
Feb. 29, 2008 (KR) ........................ 10-2008-0018827

(51) Int. Cl.
*H04B 1/10* (2006.01)
(52) U.S. Cl. ........ 375/350; 375/260; 375/267; 375/246; 370/210
(58) Field of Classification Search .................. 375/260, 375/267, 346–350; 370/203–211
See application file for complete search history.

(56) References Cited

U.S. PATENT DOCUMENTS

| | | | |
|---|---|---|---|
| 2004/0190641 A1* | 9/2004 | Ojard | 375/261 |
| 2006/0164554 A1* | 7/2006 | Wang et al. | 348/607 |
| 2007/0121740 A1* | 5/2007 | Gallagher | 375/260 |
| 2008/0056395 A1* | 3/2008 | Brink et al. | 375/260 |
| 2009/0060006 A1* | 3/2009 | Liu et al. | 375/147 |

FOREIGN PATENT DOCUMENTS
WO    WO 2007/014310    2/2007

OTHER PUBLICATIONS

S.M. Mishra et al., "Detect and Avoid: An Ultra-Wideband/WiMax Coexistence Mechanism", 2007, pp. 1-7.
Landsford, Jim, "Coexistence Problem Solution Through Arbitration Between WiMax and UWB Systems", Sep. 2007, pp. 1-2, Korean Language Publication and a relevant English language translation thereof.
Mao, Xing-Peng et al., Abstract of Polarization filtering for narrowband interference suppression in ultra-wideband communications. 2007.
Green, Marilynn, "Adjacent Frequency Coding Technique for Decreasing MB-OFDM UWB Interference to Other Radio Services", IEEE Sarnoff Synposium 2006, Mar. 2006, pp. 1-4.
Brandes, Sinja et al., "Sidelobe Suppression in OFDM Systems by Insertion of Cancellation Carriers", VTC-2005-Fall 2005—IEEE $62^{nd}$, vol. 1, Sep. 25-28, 2005, pp. 152-156.

* cited by examiner

*Primary Examiner* — Curtis Odom
(74) *Attorney, Agent, or Firm* — Harness, Dickey & Pierce, P.L.C.

(57) ABSTRACT

Example embodiments are directed to a method for detection and avoidance (DAA) of an ultra wide band (UWB) signal and a UWB terminal. The method includes: shifting a data signal by a desired frequency in a first direction; filtering the shifted data signal through a notch filter; and shifting the filtered data signal by the desired frequency in a second direction, the second direction being opposite to the first direction. The UWB terminal comprises an encoder for encoding data signals; a tone nulling unit for changing at least one tone of the plurality of tones into a null tone; an inverted fast Fourier transformer; a low pass filter for filtering the inverted fast Fourier transformed data signals; a filter circuit for attenuating an intensity of the low pass filtered signal; and a radio frequency (RF) circuit for transmitting the filtered signal.

15 Claims, 11 Drawing Sheets

ULTRA WIDE BAND DEVICE FOR DETECTION AND AVOIDANCE OF ULTRA WIDE BAND SIGNAL

PRIORITY STATEMENT

This U.S. non-provisional patent application claims priority under 35 U.S.C. §119 to Korean Patent Application No. 10-2008-0018827, filed on Feb. 29, 2008, the entire contents of which are hereby incorporated herein by reference.

BACKGROUND

1. Field

Example embodiments generally relate to a method for detection and avoidance (DAA) of an ultra wide band (UWB) signal and a UWB terminal.

2. Description of Related Art

For handling limited frequency resources, an UWB radio technology that may share frequencies without interference between narrow band and wideband systems (e.g., existing mobile communication, satellite communication, and broadcasting, etc.) is used. The UWB radio technology can be used at very low spectrum power density over a large portion of the radio spectrum as compared to a typical radio system.

The U.S. Federal Communication Commission (FCC) permits a limited use of UWB systems within a frequency band ranging from about 3.1 GHz to about 10.6 GHz. Thereafter, a research group (for example, a group from an organization like the IEEE) explored on standardizing the UWB systems for personal radio communication system.

UWB communication technology transmits information using a narrow pulse of width less than 1 nsec instead of a radio frequency (RF) carrier wave. Since the UWB communication technology has a low power spectrum (for example, baseband noise) due to a pulse property throughout a wideband, it can transmit information without interfering with other currently used radio communication systems. Furthermore, because of its wideband width, the UWB communication technology is advantageous due to its high speed of transmission as compared to a typical system.

Additionally, since a UWB signal uses a very short pulse, it can distinguish two signals from each other even when path ranges of a direct wave and a reflected wave are different (i.e., it is advantageous in a multi path range), has a relatively high accuracy of resolution of a short pulse on the order of centimeters, and can exhibit superior obstacle penetrating ability through characteristics of a wideband. Therefore, the UWB may be applicable to a position tracking system such as ground penetrating radar (GPR).

The UWB system is largely classified into two types. One type is multi band-UWB type using an Orthogonal Frequency Division Multiplexing (OFDM) modulator and demodulator method and the other type is a signal band UWB type using DS-Code Division Multiple Access (CDMA) (M-BOX) method.

The UWB may interfere with a service band of other radio communication networks due to a relatively wide bandwidth. Accordingly, national governments regulate limitations of emission power in order to prevent the UWB signal from interfering with pre-existing channels. That is, each government permits UWB communication services on the assumption that intensity of a signal will be maintained below a permitted value with respect to a corresponding band of a UWB where interference with a service band of a specific radio communication network occurs.

As per the MB-OFDM UWB standard, a maximum of 15 tones among the 128 tones should be 0 (null) for DAA. However, if 15 tones are changed into null tones, it is difficult to demodulate data in a receiver. Moreover, even if 15 tones are changed into null tones, there is limitation in lowering a signal power in a service band of other radio communication networks into a desired level (e.g., about 20 dB), due to a noise component in a data signal.

SUMMARY

Example embodiments are directed to a method of detection and avoidance (DAA) of an ultra wide band (UWB) signal and a UWB terminal capable of reducing intensity of a signal in a service band of another radio communication network.

According to example embodiments, a method of DAA of an UWB signal may include shifting a data signal by a desired frequency in a first direction; filtering the shifted data signal through a notch filter; and shifting the filtered data signal by the desired frequency in a second direction, the second direction being opposite to the first direction.

The shifting of the data signal in the first direction may include shifting the data signal by $-\pi/2$.

The shifting of the filtered data signal in the second direction may include shifting the filtered data signal by $\pi/2$.

The notch filter may attenuate a signal lying in a frequency band which may interfere with a WiMAX signal.

According to example embodiments, a method for DAA of an UWB signal may include: encoding data signals to be transmitted into encoded data signals corresponding to a plurality of tones; changing at least one tone of the plurality of tones into a null tone; performing inverted fast Fourier transformation on the encoded data signals; performing low pass filtering on the inverted fast Fourier transformed data signals to obtain a low pass filtered signal; filtering the low pass filtered signal corresponding to the null tone to attenuate a signal intensity of the low pass filtered signal to obtain a filtered signal; and converting the filtered signal into an analog signal and transmitting the analog signal.

The filtering of the low pass filtered signal may further comprise shifting the low pass filtered signal by a desired frequency in a first direction; filtering the shifted low pass filtered signal through a notch filter to obtain the filtered signal; and shifting the filtered signal by the desired frequency in a second direction, the second direction being opposite to the first direction.

The shifting of the low pass filtered signal may include shifting the low pass filtered signal by $-\pi/2$.

According to example embodiments, shifting the low pass filtered data signal may include multiplying the low pass filtered signal by an exponential function $\exp(-j\pi n/2)$, where n may represent the number of tones.

Shifting the low pass filtered signal may also include shifting the low pass filtered signal by $\pi/2$.

According to an example method of DAA, shifting the filtered signal may include multiplying the filtered signal by an exponential function $\exp(-j\pi n/2)$, where n may represent the number of tones.

As per example embodiments, the at least one tone of the plurality of tones changed into the null tone may lie in a frequency range which may interfere with a WiMAX signal and the notch filter may attenuate the data signals changed into the null tone.

According to example embodiments, a filter circuit may comprise: a first shifter for shifting a data signal by a desired frequency in a first direction; a notch filter for filtering the shifted data signal; and a second shifter for shifting the filtered data signal by the desired frequency in a second direction, the second direction being opposite to the first direction.

The first shifter may shift the data signal by $-\pi n/2$.

According to example embodiments, the first shifter may multiply the data signal by an exponential function $\exp(-j\pi n/2)$, where n represents the number of tones.

In other example embodiments, the first shifter may shift the data signal by $\pi/2$.

The second shifter may multiply the data signal by an exponential function $\exp(-j\pi n/2)$, where n may represent the number of tones.

According to example embodiments, the notch filter may attenuate a signal lying in a frequency band which may interfere with a WiMAX signal.

According to example embodiments, an ultra wide band (UWB) terminal may comprising: an encoder for encoding data signals to be transmitted into encoded data signals corresponding to a plurality of tones; a tone nulling unit for changing at least one tone of the plurality of tones into a null tone; an inverted fast Fourier transformer for performing inverted fast Fourier transformation; a low pass filter for filtering the inverted fast Fourier transformed data signals; a filter circuit for attenuating an intensity of a low pass filtered signal corresponding to the at least one null tone; and a radio frequency (RF) circuit for transmitting the filtered signal.

According to other example embodiments, the filter circuit of the ultra wide band (UWB) terminal may include a first shifter for shifting the low pass filtered signal by a desired frequency in a first direction; a notch filter for filtering the shifted signal to obtain a filtered signal; and a second shifter for shifting the filtered signal by the desired frequency in a second direction. The second direction may be opposite to the first direction.

According to example embodiments, the signal output from the low pass filter may be substantially similar to the signal output from the filter circuit and may be a frequency domain signal lying between $-\pi/2$ and $\pi/2$.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF EXAMPLE EMBODIMENTS

Figure 1:
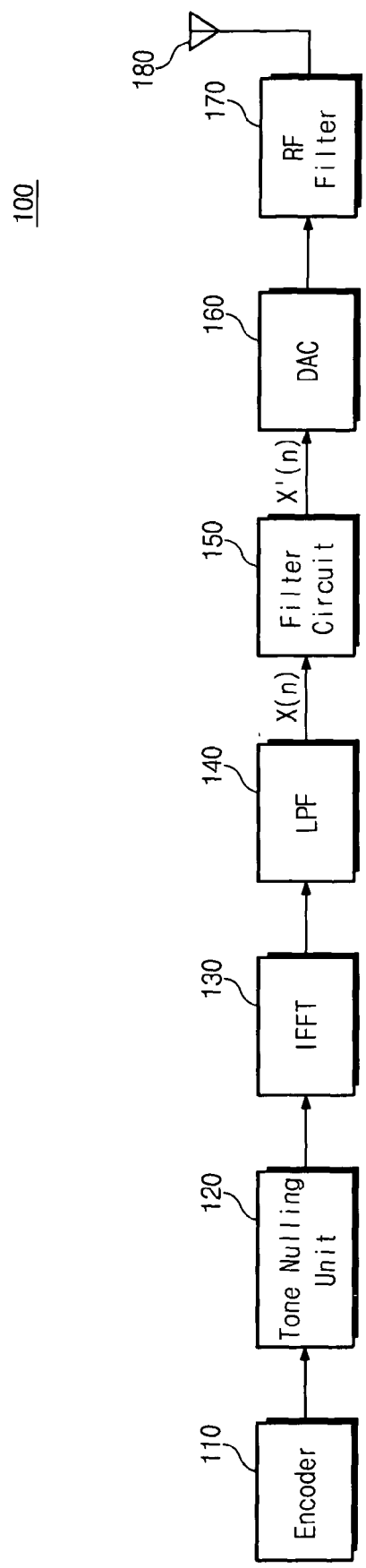
FIG. 1 illustrates components of a UWB terminal according to an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 illustrates components of an ultra wide band (UWB) terminal according to an example embodiment.

Referring to FIG. 1, the UWB terminal 100 may include an encoder 110, a tone nulling unit 120, an inverted fast Fourier Transformer (IFFT) 110, a low pass filter (LPF) 140, a filter circuit 150, a digital-analog converter (DAC) 160, a radio frequency (RF) filter 170, and an antenna 180. For the sake of brevity, only the components related to detection and avoidance (DAA) of the UWB terminal 100 are illustrated in FIG. 1. However, the UWB terminal 100 may also include additional circuits besides the ones mentioned above.

The encoder 110 may encode data signals to be transmitted into encoded data signals corresponding to a plurality of tones. According to MB-OFDM UWB standard, a frequency band that data signals of one frame occupy is about 528 MHz and one frame include 128 tones. That is, a frequency band of one tone is about 4.125 MHz. For example, since a service band of WiMAX ranges from about 3.26 GHz to about 3.28 GHz, it overlaps an MB-Orthogonal Frequency Division Multiplexing (OFDM) UWB by about 20 MHz. The 20 MHz corresponds to approximately 5 tones in the MB-OFDM UWB.

The tone nulling unit 120 may change the 5 tones that overlap the service band of WiMAX into a null tone. The 5 tones may be included in the encoded data signals corresponding to 128 tones output from the encoder 110. That is, the tone nulling unit 120 may change the encoded data signals corresponding to the 5 tones to '0'.

The IFFT 130 may perform inverted fast Fourier transformation on the encoded data signals output from the tone nulling unit 120. The data signals output from the IFFT 130 may repeat after a period of approximately $2\pi$. The LPF 140 may sample the input data signals with a frequency that may be two times higher than a frequency of an input signals in order to prevent aliasing in the DAC 160. The LPF 140 may output a signal that may lie between $-\pi/2$ and $\pi/2$. The data signal output from the LPF 140 may be in the frequency domain and may be represented as x(n).

The filter circuit 150 may attenuate a signal intensity of the data signal x(n) output from the LPF 140 that corresponds to a null tone. A signal x'(n) output from the filter circuit 150 may be converted into an analog signal by the DAC 160. The RF filter 170 may convert the analog signal output from the DAC 160 into a radio frequency (RF) signal and may transmit it using the antenna 180.

Figure 2:
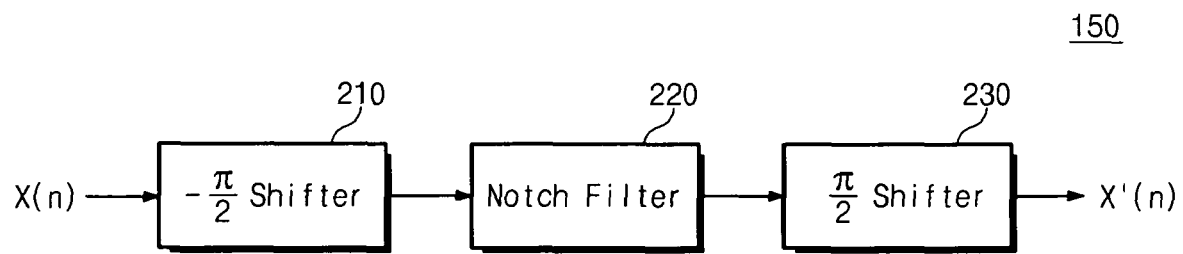
FIG. 2 illustrates example components of the filter circuit of FIG. 1.

FIG. 2 illustrates components of the filter circuit 150 of FIG. 1.

Referring to FIG. 2, the filter circuit 150 may include first and second shifters 210 and 230, and a notch filter 220.

The first shifter 210 may shift the signal x(n) output from the LPF 140 by $-\pi/2$ in the frequency domain. The notch filter 220 is a filter having a relatively narrow stopband resulting in a relatively high attenuation of a desired frequency. In the example embodiment illustrated in FIG. 2, the notch filter 220 may attenuate signal intensity of a signal corresponding to a null tone output from the first shifter 210. The second shifter 230 may shift the signal output from the notch filter 220 by $\pi/2$ in the frequency domain.

The filter circuit 150 of FIG. 2, in addition to attenuating a signal output from the LPF 140 corresponding to a null tone, may also shift the signal x(n) initially by $-\pi/2$ and later by $\pi/2$. As a result, the signal x'(n) output from the second shifter 230 may be substantially similar to the signal output from the LPF 140.

Figure 3A:
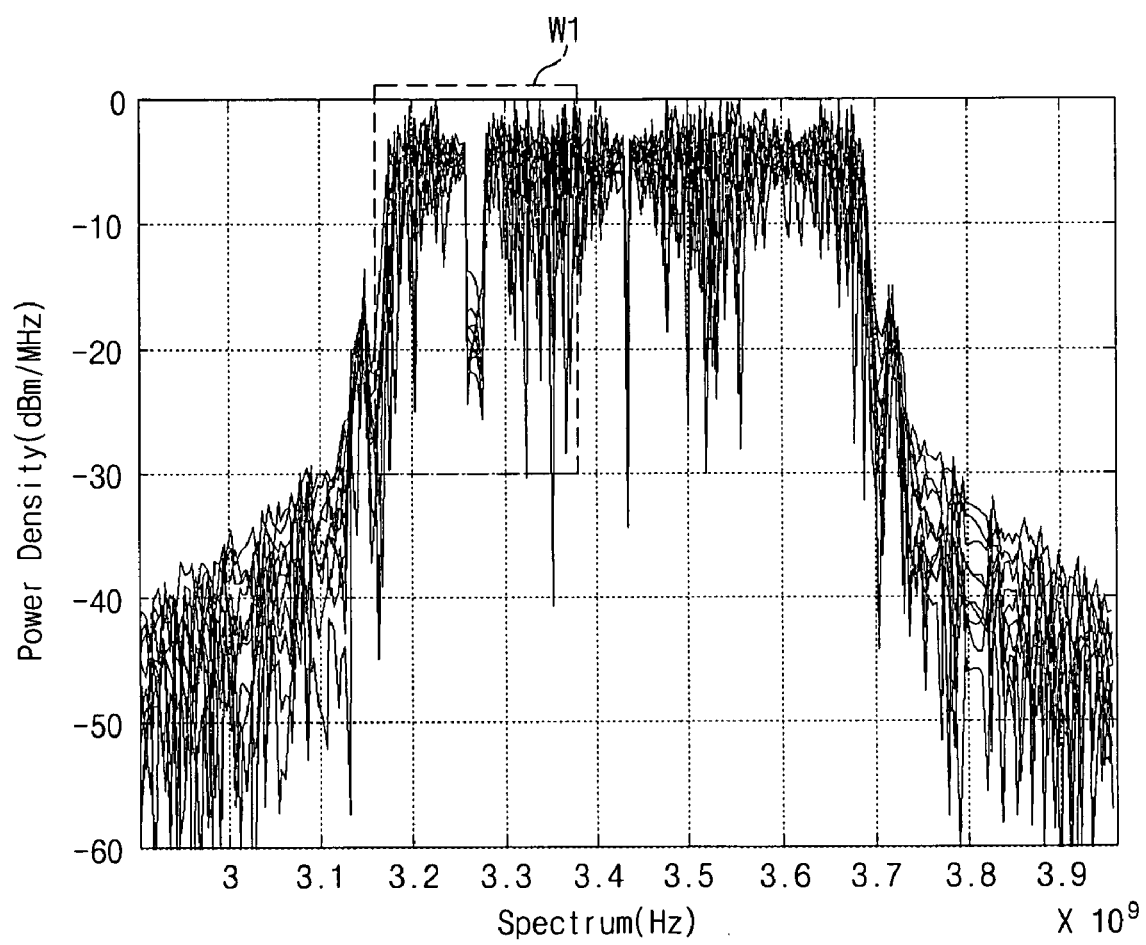
FIGS. 3A and 3B illustrate an example intensity of a signal output from a low pass filter when 5 tones are changed into a null tone through the tone nulling unit of FIG. 1.
Figure 3B:
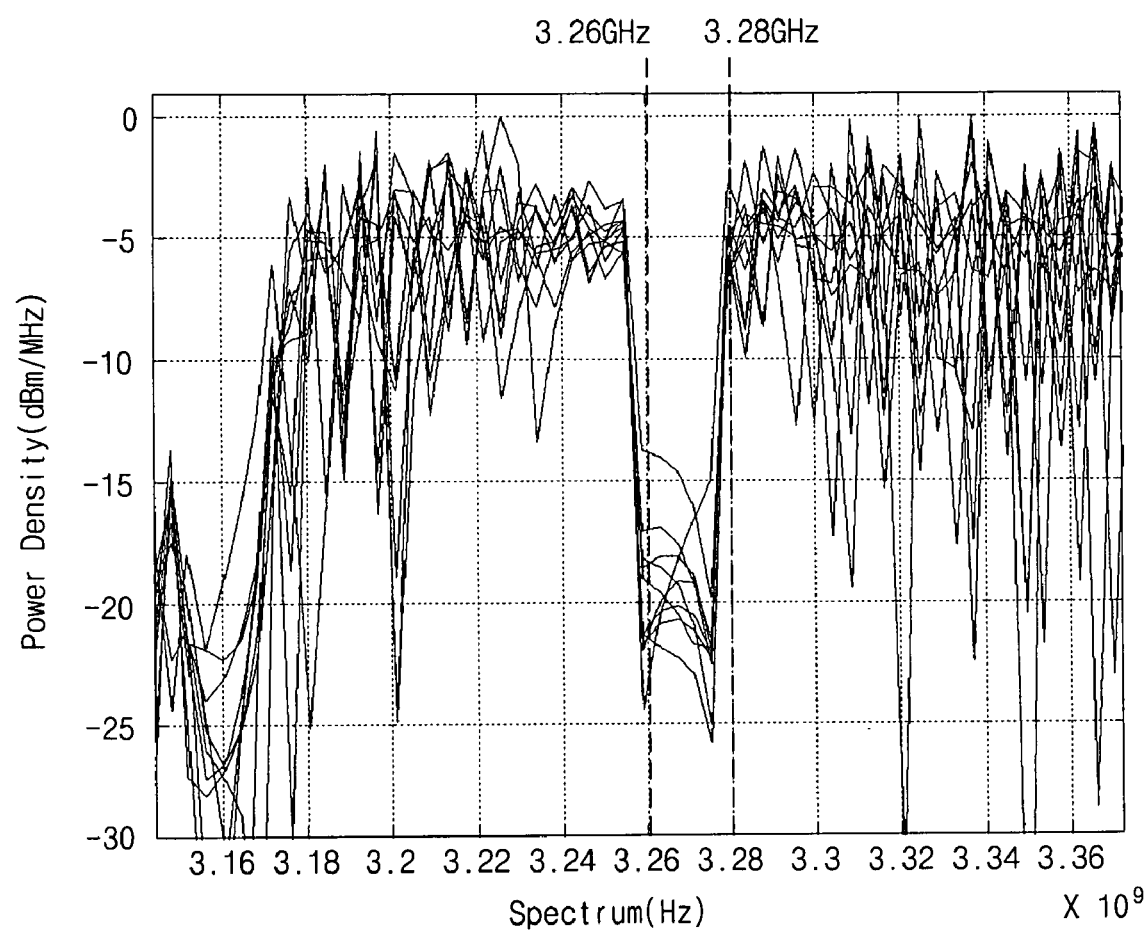

FIG. 3A is a graph illustrating intensity of a signal output from the low pass filter 140 when 5 tones are changed into a null tone through the tone nulling unit 120 of FIG. 1. FIG. 3B is an enlarged view of a window W1 of FIG. 3A.

Referring to FIGS. 3A and 3B, when the 5 tones are changed into a null tone, the signal x(n) output from the low pass filter 140 includes several noise components. Also, the intensity of the signal x(n) is not sufficiently attenuated to approximately below 20 dB in a frequency band from about 3.26 GHz to about 3.28 GHz, which, as put forth earlier, may overlap with the service band of WiMAX.

Figure 4A:
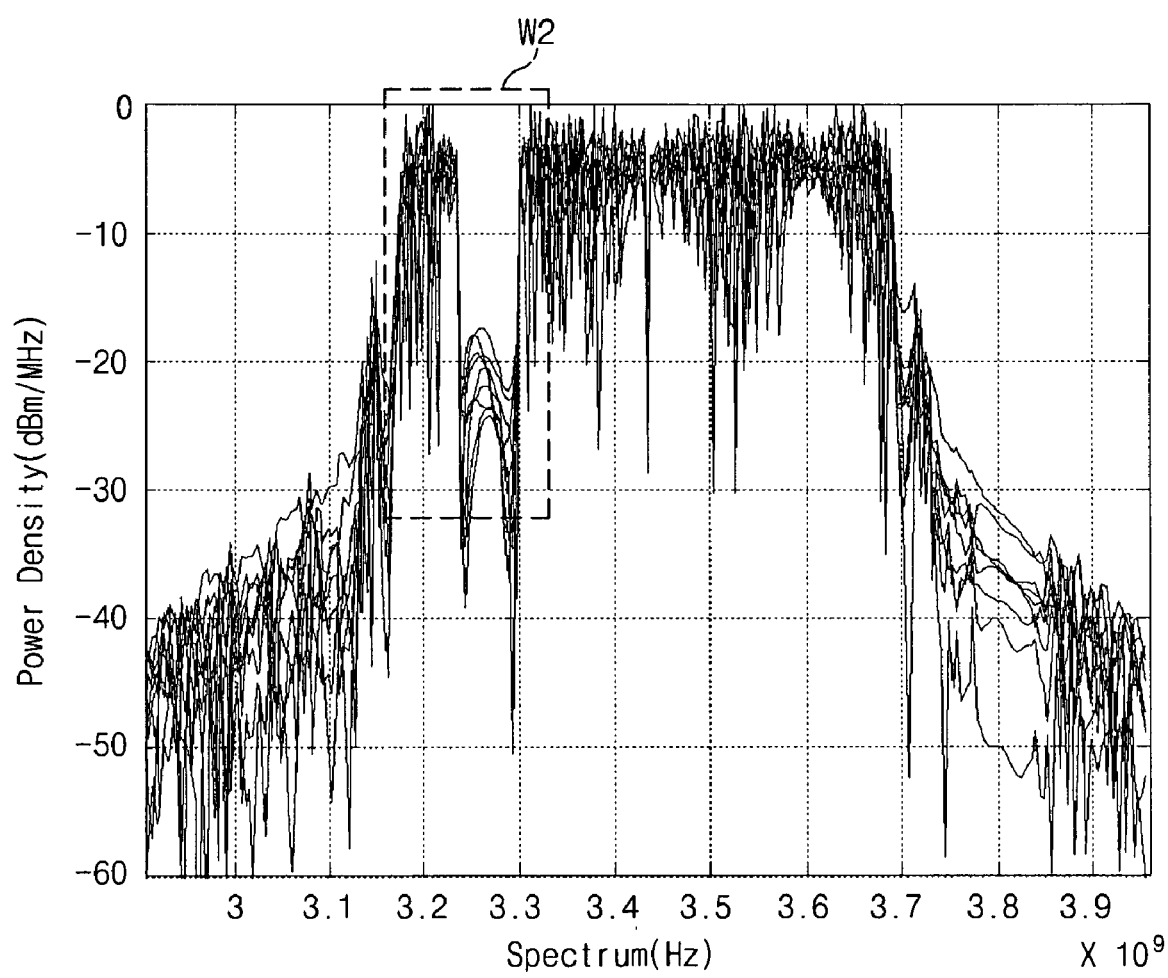
FIGS. 4A and 4B illustrate an example intensity of a signal output from a low pass filter when 15 tones are changed into a null tone through the tone nulling unit of FIG. 1.
Figure 4B:
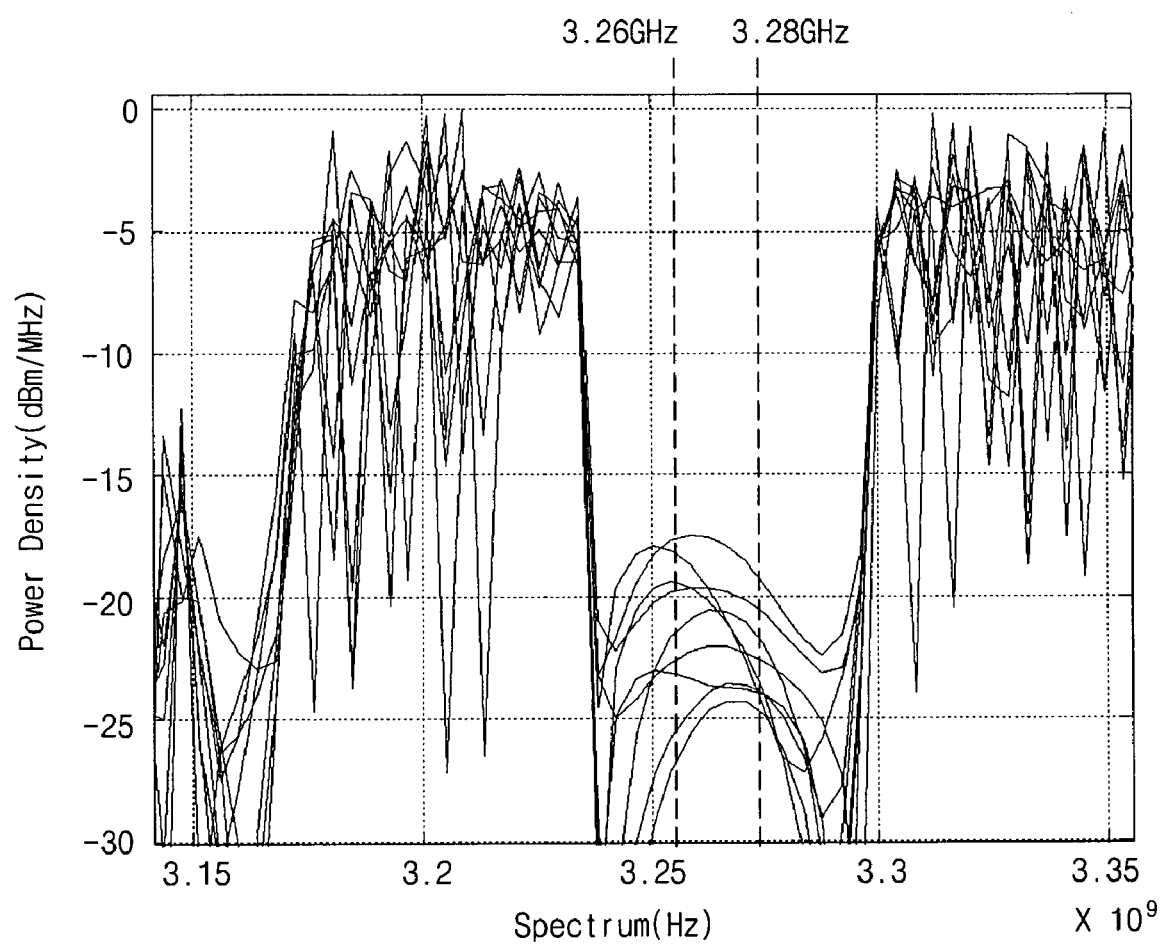

FIG. 4A is a graph illustrating intensity of a signal output from the low pass filter 140 when 15 tones are changed into a null tone through the tone nulling unit of FIG. 1. FIG. 4B is an enlarged view of a window W2 of FIG. 4A.

The MB-OFDM UWB standard may permit a maximum of 15 tones out of 128 tones to be 0 (null) for DAA. Referring to FIGS. 4A and 4B, even if 15 tones are changed into a null tone by the tone nulling unit 120 of FIG. 1, it may be seen that intensity of the signal x(n) output from the low pass filter 140 may not be attenuated sufficiently below about 20 dB in the frequency band from about 3.26 GHz to about 3.28 GHz, which, as put forth earlier, may overlap with the service band of WiMAX. The filter circuit 150, according to example embodiments, may perform filtering in order to sufficiently attenuate intensity of the signal corresponding to tones that are changed into a null tone by the tone nulling unit 120.

Figure 5:
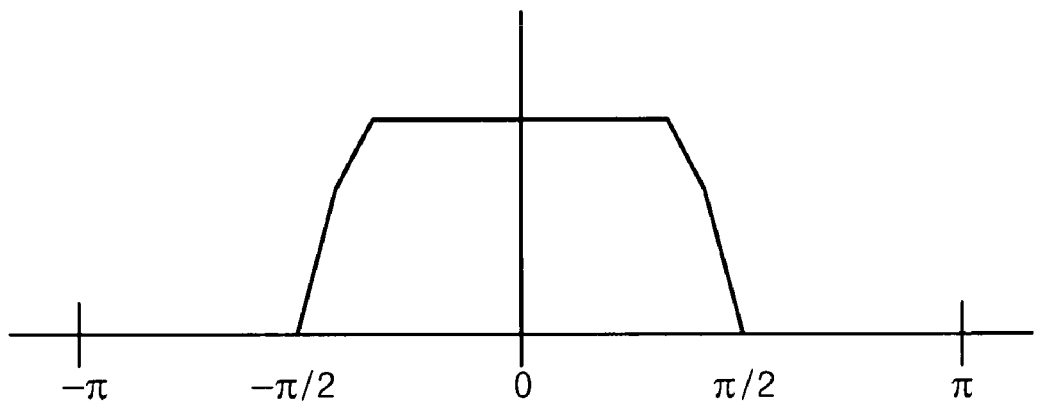
FIG. 5 illustrates an example signal output from the low pass filter of FIG. 1.

FIG. 5 illustrates a signal output from the LPF 140 of FIG. 1. Referring to FIG. 5, the signal x(n) output from the LPF 140 ranges from $-\pi/2$ to $\pi/2$ in a frequency domain.

Figure 6:
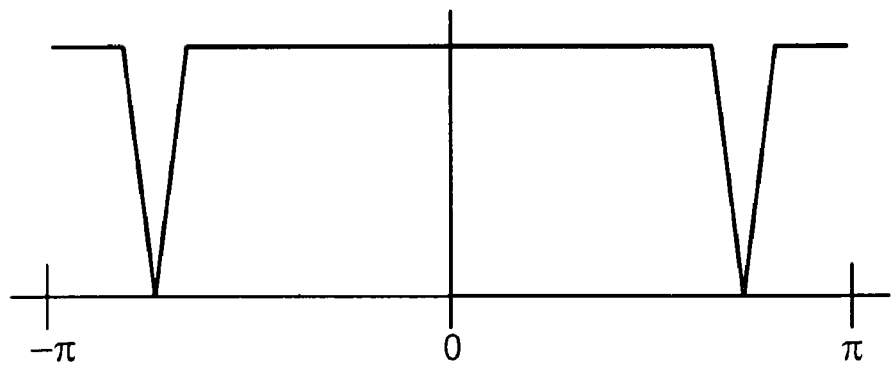
FIG. 6 illustrates an example signal transmission waveform of the notch filter of FIG. 2.

FIG. 6 illustrates signal transmission characteristics of the notch filter 220 of FIG. 2. As shown in FIG. 6, the notch filter 220 has V-shaped characteristics at the both sides of the center point 0. Accordingly, when the notch filter 220 filters the signal x(n) output from the LPF 140, a null tone and a signal of an unwanted frequency may be attenuated.

Figure 7A:
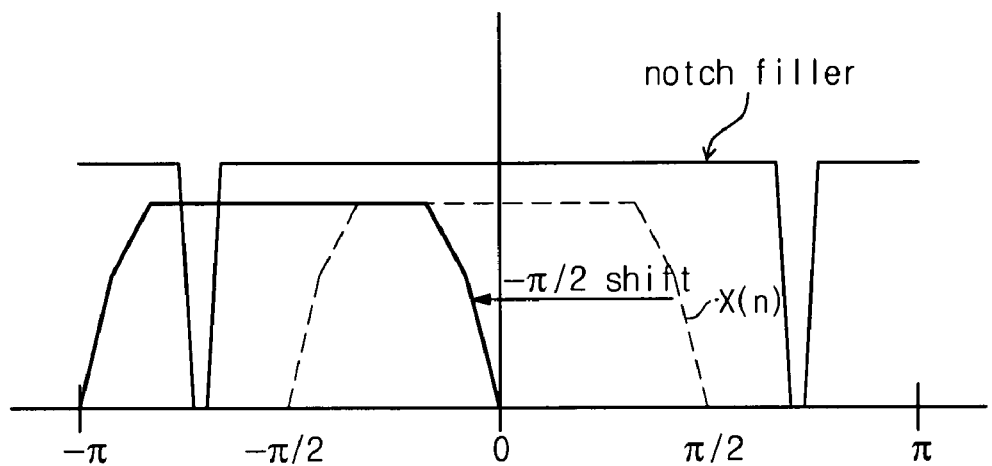
FIGS. 7A through 7C illustrate an operation of the filter circuit of FIG. 2.
Figure 7B:
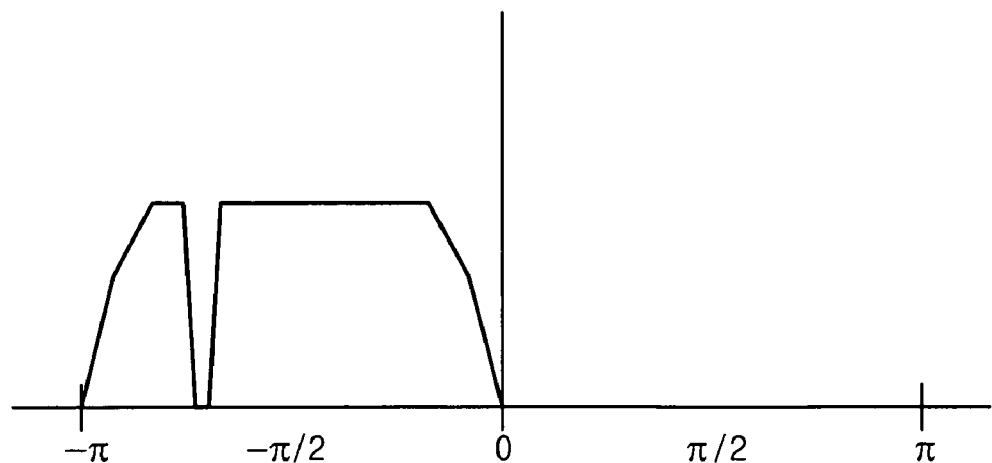
Figure 7C:
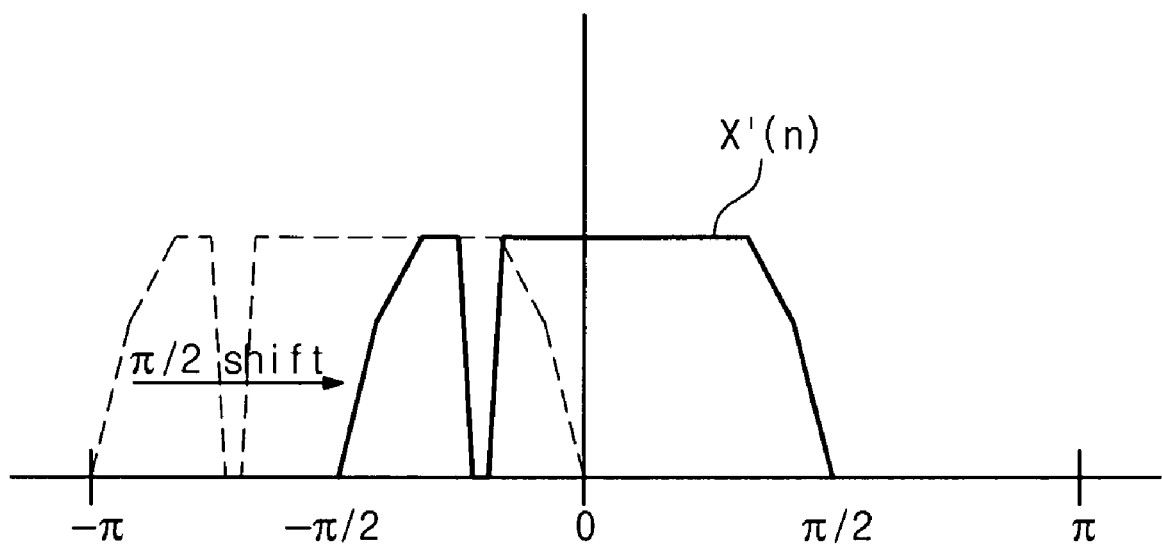

FIGS. 7A through 7C illustrate an operation of the filter circuit 150 of FIG. 2.

Referring to FIGS. 2 and 7A, the first shifter 210 may shift the signal x(n) output from the LPF 140 by $-\pi/2$.

As illustrated in FIG. 7B, after the signal output from the first shifter 210 passes through the notch filter 220, signals corresponding to a null tone may be attenuated.

Referring to FIG. 7C, the second shifter 230 may shift the signal output from the notch filter 220 by $\pi/2$. The second shifter 230 may output a signal x'(n), which may correspond to the signal x(n) output from the low pass filter 140 having the signals corresponding to a null tone attenuated.

In Equation (1) below, the signal x(n) output from the LPF 140 is expressed as a signal X(k) of a frequency domain.

$$X(k) = \sum_{n=0}^{N-1} x(n) \cdot \exp\left(-j\frac{2\pi}{N}nk\right) \quad (1)$$

where k represents an index of a frequency domain and n represents an index of a time domain.

When the number of tones in one frame is 128 (i.e., N=128) and since a period of the signal x(n) is $2\pi$, $\pi/2$ may be denoted as N/4. Therefore, shifting by $-\pi/2$ and $\pi/2$ in the first and second shifters 210 and 230 is equivalent to multiplying the signal x(n) of the time domain by $\exp(-j\pi n/2)$ as shown in Equation (2) below.

$$X\left(k + \frac{N}{4}\right) = \sum_{n=0}^{N-1} x(n) \cdot \exp\left(-j\frac{2\pi}{N}n\left(k + \frac{N}{4}\right)\right) \quad (2)$$

$$= \sum_{n=0}^{N-1} x(n) \cdot \exp\left(-j\frac{2\pi}{N}nk\right) \cdot \exp\left(-j\frac{2\pi}{N}\frac{N}{4}k\right)$$

-continued $$= \sum_{n=0}^{N-1} \left( x(n) \cdot \exp\left(-j\frac{2\pi}{N}n\right) \right) \cdot \exp\left(-j\frac{2\pi}{N}nk\right)$$

Since $\exp(-j\pi n/2)=\cos(\pi n/2)-j\sin(\pi n/2)$, the first and second shifters 210 and 230 may be required to perform very simple calculations and thus their circuits may be relatively easy to design.

Figure 8A:
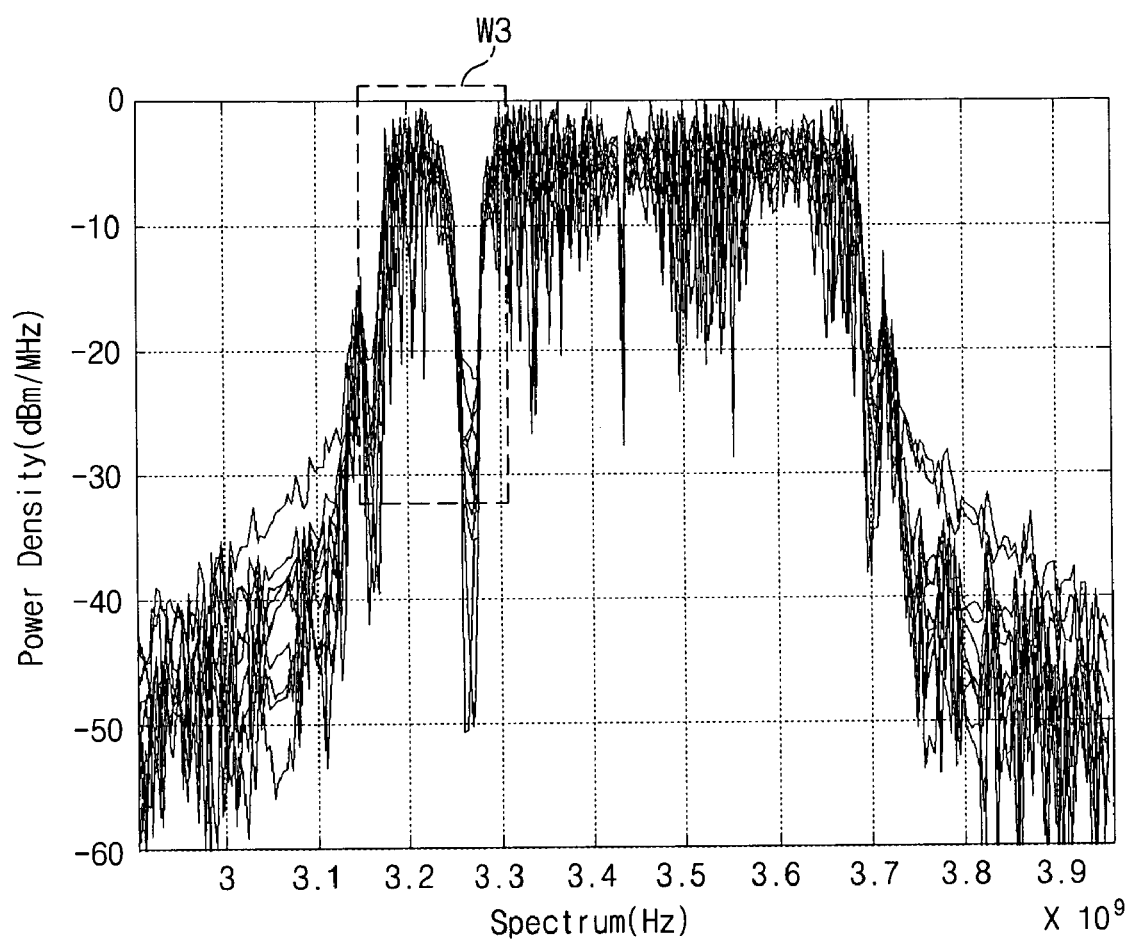
FIGS. 8A and 8B are views illustrating intensity of a signal output from the filter circuit of FIG. 1 when 5 tones are changed into a null tone through the tone nulling unit of FIG. 1.
Figure 8B:
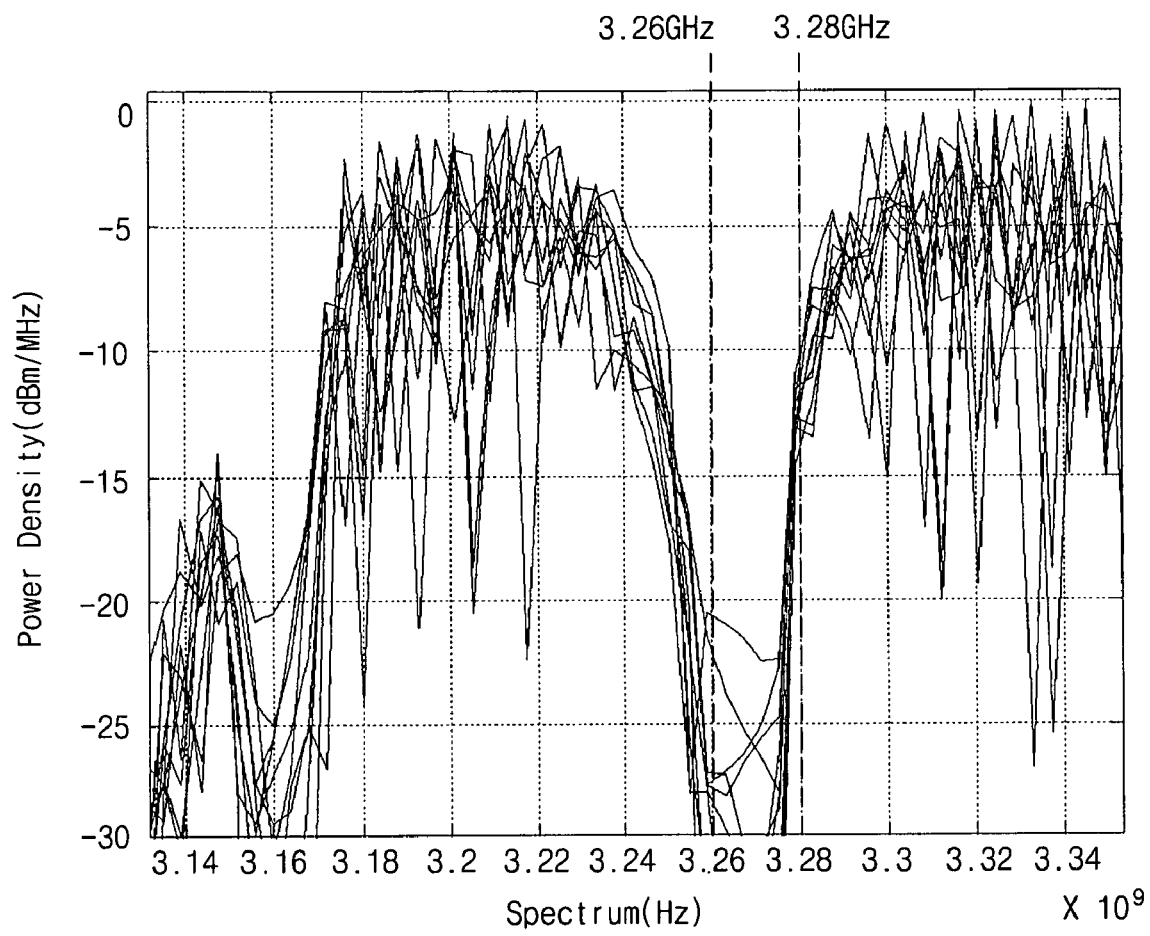

FIG. 8A is a graph illustrating intensity of a signal output from the filter circuit 150 when 5 tones are changed into a null tone through the tone nulling unit of FIG. 1. FIG. 8B is an enlarged view of a window W3 of FIG. 8A;

Referring to FIGS. 8A and 8B, even if only 5 tones are changed into a null tone by the tone nulling unit 120, intensity of the signal x'(n) is sufficiently attenuated in the frequency band from about 3.26 GHz to about 3.28 GHz, which, as put forth previously, may overlap with the service band of WiMAX.

According to the method for DAA of a UWB signal, as per example embodiments, intensity of the UWB signal is sufficiently attenuated in a service band of another radio communication network, for example, WiMAX. Additionally, since the UWB terminal for DAA of a UWB signal needs to be equipped, for example, with only a simple shifter and notch filter, an economical and efficient circuit design may be possible.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An ultra wide band (UWB) terminal, comprising:
an encoder for encoding data signals to be transmitted into encoded data signals corresponding to a plurality of tones;
a tone nulling unit for changing at least one tone of the plurality of tones into a null tone;
an inverted fast Fourier transformer for performing inverted fast Fourier transformation on the encoded data signals;
a low pass filter for filtering the inverted fast Fourier transformed data signals to produce first filtered data signals;
a notch filter circuit including,
a first shifter for shifting the first filtered data signals by a desired frequency in a first direction,
a notch filter for filtering the shifted data signals, and
a second shifter for shifting the filtered data signals from the notch filter by the desired frequency in a second direction to produce a second filtered data signals, the second direction being opposite to the first direction; and
a radio frequency (RF) circuit for transmitting the second filtered data signals from the notch filter circuit.

2. The ultra wide band (UWB) terminal of claim 1, wherein the first shifter shifts the first filtered data signals by $-\pi/2$.

3. The ultra wide band (UWB) terminal of claim 1, wherein the first shifter multiplies the first filtered data signals by an exponential function $\exp(-j\pi n/2)$, where n represents the number of tones.

4. The ultra wide band (UWB) terminal of claim 1, wherein the second shifter shifts the filtered data signals by $\pi/2$.

5. The ultra wide band (UWB) terminal of claim 1, wherein the second shifter multiplies the filtered data signals by an exponential function $\exp(-j\pi n/2)$, where n represents the number of tones.

6. The ultra wide band (UWB) terminal of claim 1, wherein the notch filter attenuates the shifted data signals lying in a frequency band which interferes with a WiMAX signal.

7. An ultra wide band (UWB) terminal comprising:
an encoder for encoding data signals to be transmitted into encoded data signals corresponding to a plurality of tones;
a tone nulling unit for changing at least one tone of the plurality of tones into a null tone;
an inverted fast Fourier transformer for performing inverted fast Fourier transformation on the encoded data signals;
a low pass filter for filtering the inverted fast Fourier transformed data signals;
a filter circuit for attenuating an intensity of a low pass filtered signal corresponding to the at least one null tone; and
a radio frequency (RF) circuit for transmitting the filtered signal.

8. The UWB terminal of claim 7, wherein the filter circuit includes:
a first shifter for shifting the low pass filtered signal by a desired frequency in a first direction;
a notch filter for filtering the shifted signal to obtain a filtered signal; and
a second shifter for shifting the filtered signal by the desired frequency in a second direction, the second direction being opposite to the first direction.

9. The UWB terminal of claim 8, wherein the first shifter shifts the low pass filtered signal by $-\pi/2$.

10. The UWB terminal of claim 8, wherein the first shifter multiplies the low pass filtered data signal by an exponential function $\exp(-j\pi n/2)$, where n represents the number of tones.

11. The UWB terminal of claim 8, wherein the second shifter shifts the low pass filtered signal by $\pi/2$.

12. The UMB terminal of claim 8, wherein the second shifter multiplies the signal filtered by the notch filter by an exponential function $\exp(-j\pi n/2)$, where n represents the number of tones.

13. The UWB terminal of claim 7, wherein the signal output from the low pass filter is substantially similar to the signal output from the filter circuit.

14. The UWB terminal of claim 7, wherein the low pass filter outputs a frequency domain signal lying between $-\pi/2$ and $\pi/2$.

15. The filter circuit of claim 8, wherein the notch filter attenuates a signal lying in a frequency band which interferes with a WiMAX signal.

* * * * *